(12) United States Patent
Hayasaka et al.

(10) Patent No.: US 12,176,795 B2
(45) Date of Patent: Dec. 24, 2024

(54) ROTARY ELECTRIC MACHINE

(71) Applicant: Hitachi Industrial Products, Ltd., Tokyo (JP)

(72) Inventors: Yasushi Hayasaka, Tokyo (JP); Eiichiro Tokizaki, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 307 days.

(21) Appl. No.: 17/792,455

(22) PCT Filed: Nov. 6, 2020

(86) PCT No.: PCT/JP2020/041541
§ 371 (c)(1),
(2) Date: Jul. 13, 2022

(87) PCT Pub. No.: WO2021/192392
PCT Pub. Date: Sep. 30, 2021

(65) Prior Publication Data
US 2023/0022399 A1    Jan. 26, 2023

(30) Foreign Application Priority Data
Mar. 26, 2020 (JP) ................................. 2020-055565

(51) Int. Cl.
*H02K 9/06* (2006.01)
*H02K 5/18* (2006.01)

(52) U.S. Cl.
CPC .................. *H02K 9/06* (2013.01); *H02K 5/18* (2013.01)

(58) Field of Classification Search
CPC .......... H02K 9/06; H02K 5/18; H02K 5/1732; H02K 9/12
See application file for complete search history.

(56) References Cited

U.S. PATENT DOCUMENTS

| 2004/0150270 A1 | 8/2004 | Nagayama et al. | |
| 2008/0303360 A1* | 12/2008 | Vinson | H02K 9/06 310/90 |
| 2011/0068644 A1* | 3/2011 | Kamp | H02K 9/14 310/58 |

FOREIGN PATENT DOCUMENTS

| JP | 59-44156 U | 3/1984 |
| JP | 63-107439 A | 5/1988 |

(Continued)

OTHER PUBLICATIONS

International Search Report (PCT/ISA/210) issued in PCT Application No. PCT/JP2020/041541 dated Jan. 12, 2021 with English translation (six (6) pages).

(Continued)

*Primary Examiner* — Thomas Truong
(74) *Attorney, Agent, or Firm* — Crowell & Moring LLP

(57) ABSTRACT

The present invention provides a rotary electric machine which suppresses a temperature rise of bearings by reducing heat transfer from internal air to the bearings and heat conduction from a rotor core, and improves the lubrication life of the bearings. A rotary electric machine of the present invention comprises a rotor including a shaft; a stator placed facing the rotor with a certain gap (an air gap) therebetween and supported by a stator frame; bearings which sustain the shaft; and end brackets which hold the bearings, wherein one of the end brackets includes a heat insulating layer on an inner side or an outer side of the machine to prevent heat from flowing into the bearings.

10 Claims, 4 Drawing Sheets

(56) References Cited

FOREIGN PATENT DOCUMENTS

| | | |
|---|---|---|
| JP | 2-68653 U | 5/1990 |
| JP | 2001-103704 A | 4/2001 |
| JP | 5143094 B2 | 2/2013 |

OTHER PUBLICATIONS

Japanese-language Written Opinion (PCT/ISA/237) issued in PCT Application No. PCT/JP2020/041541 dated Jan. 12, 2021 (four (4) pages).

\* cited by examiner

ROTARY ELECTRIC MACHINE

TECHNICAL FIELD OF THE INVENTION

The present invention relates to a rotary electric machine and particularly relates to a rotary electric machine with an improved structure for cooling bearings that support the shaft of a rotor.

BACKGROUND ART

Generally, in a rotary electric machine that mainly includes a stator, a rotor, and bearing parts that support the shaft of the rotor, temperatures of coils, cooling air inside the rotary electric machine, and the bearing parts rise along with an increase in high output density.

Bearing parts such as rolling bearings are lubricated with grease or oil. Reducing a temperature rise of the bearing parts reduces deterioration of the grease or oil and extends the lubrication life of the bearings.

To reduce a temperature rise of the bearing parts as noted above, various cooling methods are provided for rotary electric machines. As cooling methods for rotary electric machines, there are an open type that takes in cooling air from outside and cools respective parts inside a rotary electric machine and a fully closed type that does not bring cooling air into a rotary electric machine. In terms of cooling capacity, the fully closed type is generally inferior to the open type and therefore, cooling performance of, especially, bearing parts is required to be improved.

Conventional arts for improving the cooling performance of bearing parts in a rotary electric machine are disclosed in Patent Documents 1 and 2.

Document 1 discloses a rotary electric machine which includes a fan and a ventilation path for cooling a bearing located on an exhaust side. Document 2 discloses a rotary electric machine in which the oil bath of a sliding bearing and a bracket are cooled by air that is delivered from the fan of a cooler.

DOCUMENT LIST

Patent Document

Document 1: JP 5143094 B2
Document 2: JP S63-107439 A

SUMMARY OF INVENTION

Technical Problem

However, a structure disclosed in Document 1 is disadvantageous in that the structure is complicated for forming the fan and the ventilation path for cooling the bearing. A structure disclosed in Document 2 has a problem that it is impossible to reduce a temperature rise of the bearing due to heat conduction from a stator core because the bracket does not have a heat insulating layer.

The present invention was developed in view of the above noted points. An object of the present invention is to provide a rotary electric machine
which suppresses a temperature rise of bearings by reducing heat transfer from internal air to the bearings and heat conduction from a rotor core, and improves the lubrication life of the bearings.

Solution to Problem

In order to achieve the foregoing object, a rotary electric machine of the present invention comprises: a rotor including a shaft; a stator placed facing the rotor with a certain gap (an air gap) therebetween; bearings which rotatably support the shaft; and end brackets which hold the stator, wherein one of the end brackets includes a heat insulating layer on an inner side or an outer side of the machine to prevent heat from flowing into the bearings.

Advantageous Effects of Invention

According to the present invention, a rotary electric machine is provided which suppresses a temperature rise of bearings by reducing heat transfer from internal air to the bearings and heat conduction from a rotor core, and improves the lubrication life of the bearings.

DESCRIPTION OF EMBODIMENTS

Figure 1:
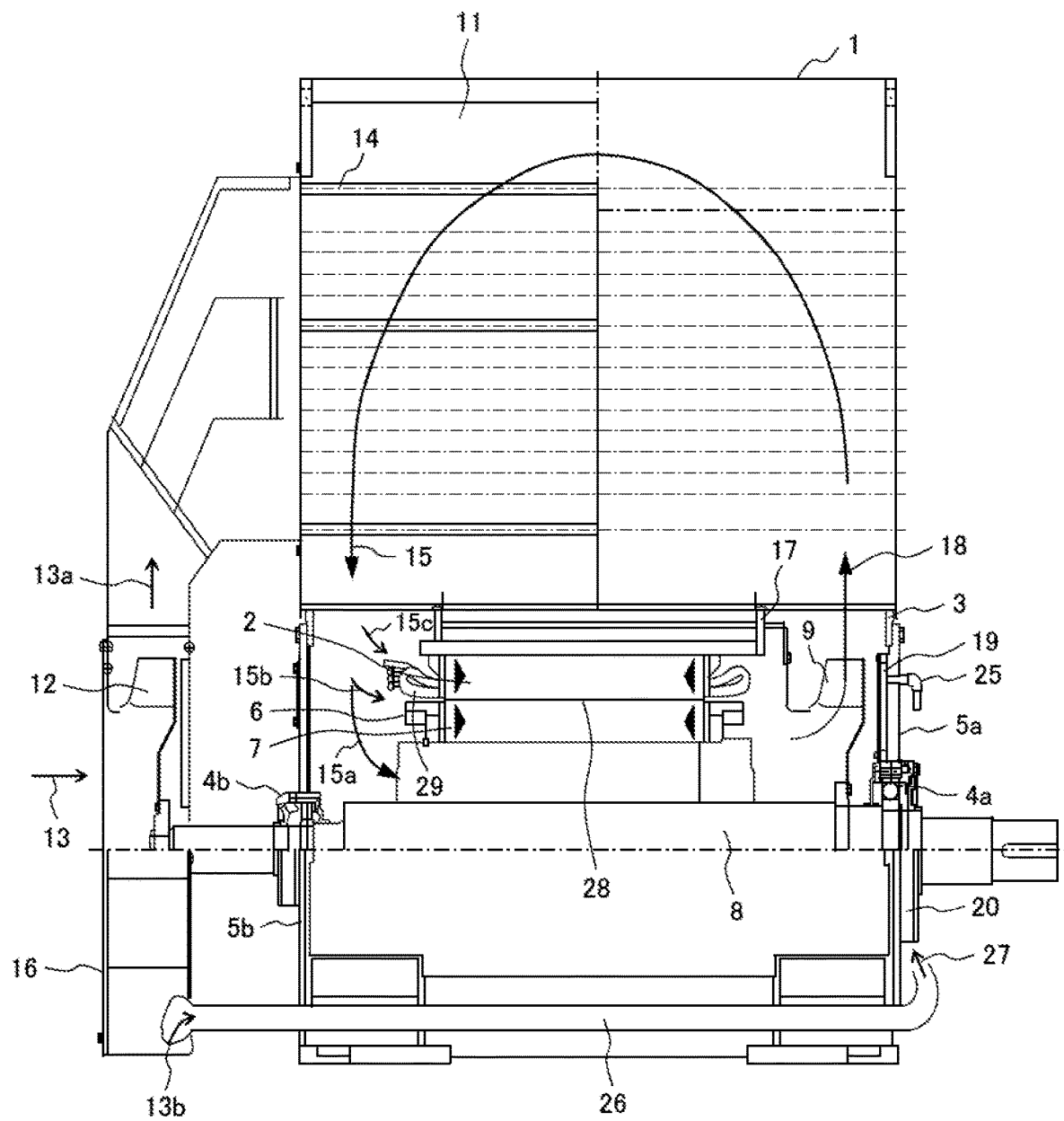
FIG. 1 is a longitudinal sectional diagram depicting a rotary electric machine according to Embodiment 1 of the present invention.

In the following, a rotary electric machine of the present invention is described based on its embodiments depicted in the drawings. Note that identical reference characters are used for identical components in respective embodiments.

Embodiment 1

Figure 2:
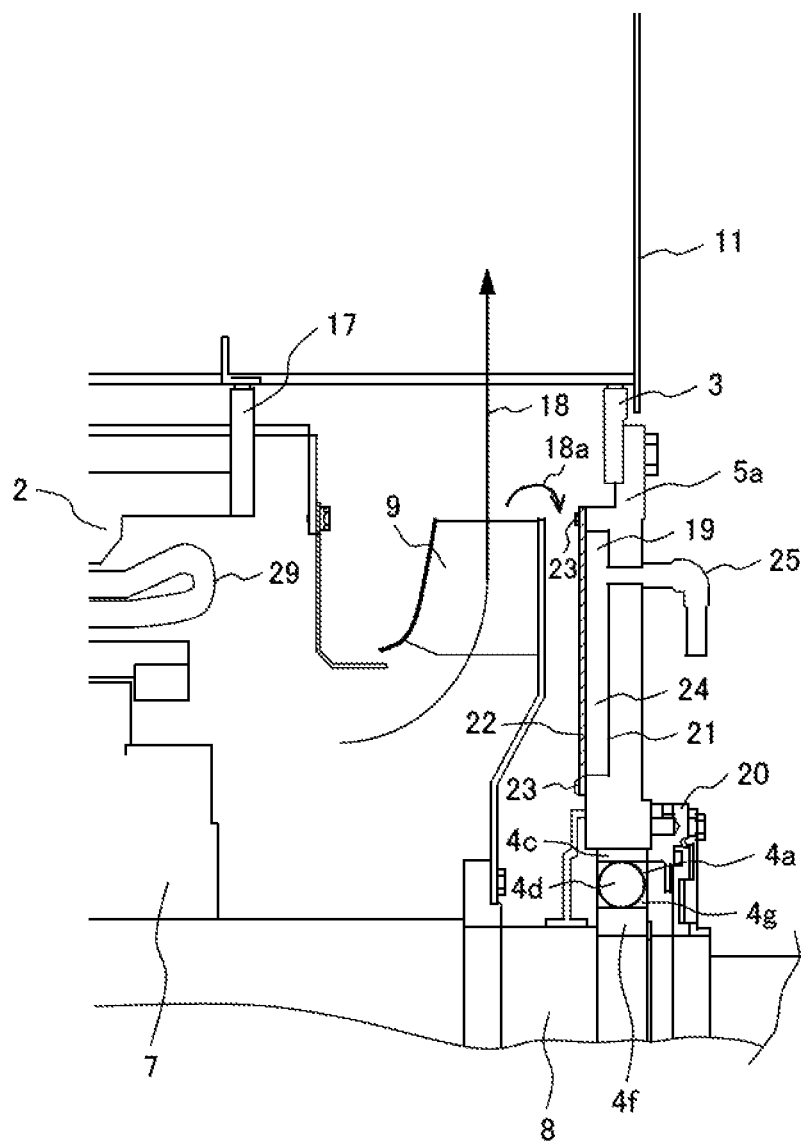
FIG. 2 is a partial sectional diagram depicting an enlarged view of vicinity of a bearing in a rotary electric machine according to Embodiment 1 of the present invention.

FIG. 1 and FIG. 2 depict a rotary electric machine according to Embodiment 1 of the present invention.

As is depicted in FIG. 1, a rotary electric machine 1 of the present embodiment mainly includes a stator 2, a stator frame 3 which supports the stator 2, end brackets 5a, 5b which are fixed to the stator frame 3 and hold bearings 4a, 4b disposed in two positions in an axial direction, the stator 2 and a rotor 6 which will be described later being between the two positions, a rotor 6 which is rotatably supported by the bearings 4a, 4b and is placed facing the stator 2 with a certain gap (an air gap 28) therebetween, the rotor 6 having a shaft 8 and rotating, a rotor core 7 which is included in the rotor 6, an inner fan 9 which is attached to the shaft 8 and placed on a side where one bearing 4a is placed to circulate air inside the rotary electric machine 1, an air cooler 11 which is provided above the stator frame 3, and an outer fan 12 which is attached to the shaft 8 and placed on a side where the other bearing 4b is placed to bring cooling air into the air cooler 11.

The air cooler 11 includes a tube group 14 through which external air 13 passes and removes heat from internal air 15 having cooled the stator 2 and the rotor 6. The outer fan 12 is an air blower and connected to the other end of the shaft 8 (opposite to a side where the inner fan 9 is placed) and feeds first external air 13a from an air inlet of an outer fan duct 16 into the air cooler 11.

Then, a structure that ventilates and cools the rotary electric machine 1 of the present embodiment is described.

As is depicted in FIG. 1, the inner fan 9 brings internal air 15 cooled by the air cooler 11 into the interior of the rotary electric machine 1, the internal air 15 diverging into a first internal air 15a toward inside the rotor 6, a second internal air 15b toward the air gap 28, and a third internal air 15c flowing to a stator coil end 29. The stator 2 and rotor 6 are cooled with these internal airs 15.

In addition, the first internal air 15a toward inside the rotor 6 flows into the air gap 28 after cooling the rotor 6. The second internal air 15b toward the air gap 28 merges with the first internal air 15a that is in the air gap 28 and cools the stator 2, and flows into the stator frame 17.

The third internal air 15c flowing to the stator coil end 29 flows into the stator frame 17 after cooling the stator coil end 29 and merges with the first internal air 15a and the second internal air 15b. Finally, the air cools a stator coil end 29 located on a downstream side of the cooling air 13b on the side where the inner fan 9 is installed, and internal air with increased temperature is brought out to the air cooler 11 by the inner fan 9 as indicated by an arrow 18.

As is described before, the air cooler 11 internally includes the tube group 14 having plural tubes and removes heat from the internal air 15 having cooled the stator 2 and the rotor 6. The first external air 13a which is a secondary cooling medium brought in by the outer fan 12 is allowed to flow through the tube group 14. The internal air 15 is cooled by heat exchange with the first external air 13a inside the tubes via the tube walls when passing through between the tubes of the tube group 14 in the air cooler 11.

What has been described above is a structure of a cooling system of a typical rotary electric machine 1, particularly, a rotary electric machine 1 that allows the internal air 15 to flow in one direction in parallel with the shaft 8 of the rotor 6 and cools the rotor 6 and the stator 2.

In this cooling system of the rotary electric machine 1, the internal air with increased temperature after cooling the rotor 6 and the stator 2, indicated by the arrow 18, can raise the temperature of the bearing 4a.

For this reason, in the present embodiment, in order to prevent overheating of the bearing 4a due to a temperature rise, a heat insulating layer 19 to prevent heat from flowing in the bearing 4a is provided in the end bracket 5a that mounts the bearing 4a located on the side where the inner fan 9 is installed and on the downstream side of the cooling air flow.

FIG. 2 depicts an enlarged view of vicinity of the bearing 4a in the rotary electric machine 1 of the present embodiment with the heat insulating layer 19.

As is depicted in FIG. 2, heat flow into the bearing 4a is occurred, in sequence, by heat transfer from the internal air indicated by the arrow 18 to the end bracket 5a and by heat conduction from the end bracket 5a to the bearing 4a.

Specifically, heat is conveyed from the end bracket 5a to an outer ring 4c, grease 4g, and a ball 4d. Other heat is conducted from the stator 2 to the stator frame 3 and conveyed to the end bracket 5a. Other heat is conveyed from the shaft 8 to an inner ring 4f, the ball 4d, and the grease 4g. Furthermore, there are frictional heat between the ball 4d and the inner ring 4f/outer ring 4c and heat generated by agitating the grease 4g with the ball 4d.

Without a device that cools the lubricant of the bearing 4a, the bearing 4a is mainly cooled by heat transfer to external air from a bearing box 20 that is exposed to the external air. Particularly, rolling bearings lubricated with grease basically do not have any other cooling element.

Therefore, in the present embodiment, a simple structure for reducing heat entering the bearing 4a and improving cooling performance is employed in order to decrease the temperature of the bearing 4a, suppress deterioration of the grease 4g, and extend the lubrication life of the bearing 4a. Namely, the heat insulating layer 19 is located, against heat that enters the end bracket 5a from a divergent internal-air 18a diverged from the internal air indicated by the arrow 18, on the internal-air side portion of the end bracket 5a and in a place where the end bracket 5a is exposed to the divergent internal-air 18a from the inner fan 9.

Specifically, a recess 21 is provided on the inner side portion of the end bracket 5a facing the internal air; a heat insulating material 24 is placed in the recess 21; and the heat insulating material 24 is sealed with a cover 22 that is bolted to the end bracket 5a.

Note that the heat insulating material 24 may be configured with one of glass wool, rock wool, and a vacuum insulation material which is commonly used, and may be configured with an air layer.

When the heat insulating material 24 is configured with the air layer, it is important that the cover 22 covering the air layer in the recess 21 should prevent flow between the heat insulating layer 19 and the divergent internal-air 18a by properly installing the bolts 23 in the inner and outer circumference of the cover 22. In this case, an external air communicating tube 25 or valve to make the heat insulating layer 19 communicate with the external air may be provided to bring low-temperature external air into the heat insulating layer 19.

The recess 21 and the heat insulating layer 19 provided in the end bracket 5a and the heat insulating material 24, which are mentioned above, also act as thermal resistance against heat conducted through the stator frame 3 from the stator 2 and can suppress heat that enters the bearing 4a and reduce the temperature rise of the bearing 4a.

Furthermore, it is possible to further reduce the temperature of the bearing 4a by providing a fin (not depicted) on the outside surface of the end bracket 5a to improve the characteristic of heat transfer with external air of the outside surface of the end bracket 5a.

In the present embodiment, cooling is performed by using air as cooling air 13b (see FIG. 1) which is taken in by the outer fan 12 that is an air-intake fan for the air cooler 11 and directly connected to the rotor 6. Namely, it is possible to draw heat from the bearing 4a and reduce the temperature of the bearing 4a by introducing the cooling air 13b taken in with the outer fan 12 from the outer fan duct 16 into a pipe 26 and by delivering the cooling air 13b toward the bearing 4a, the bearing box 20, the end bracket 5a, and the cooling fin or the like.

Furthermore, it is possible to reduce the temperature of the bearing 4a by elaborating and combining the respective components of the foregoing structure, although such structures are not depicted. For example, the end bracket 5a may include the recess 21 for providing the heat insulating layer 19 on an outer side portion of the end bracket 5a facing external air, and the heat insulating material 24 may be provided in the recess 21, forming the heat insulating layer 19. This is a structure where the heat insulating layer 19 is provided on the outer side portion of the end bracket 5a, the portion being on the outside of the machine.

Thereby, a temperature rise due to heat transfer to the end bracket 5a is prevented while internal air flows in and out from the heat insulating layer 19, and a temperature rise of the bearing 4a is suppressed and the lubrication life of the bearing 4a is improved.

In addition, the external air communicating tube 25 or valve to make the heat insulating layer 19 communicate with external air may be provided to allow an external cooling medium or the cooling medium of the air cooler 11, e.g., air or water, to pass through the tube 25 or valve for cooling. This also produces the effect of suppressing a temperature rise of the bearing 4a and improving the lubrication life of the bearing 4a.

Cooling the end bracket 5a may be performed in a simplest manner as below. The cooling air 13b taken in by the outer fan 12 is introduced through the outer fan duct 16 into the pipe 26 and the cooling air 27 carried in through the pipe 26 is allowed to pass through the external air communicating tube 25 that makes the heat insulating layer 19 communicate with external air. This configuration reduces a temperature rise of the bearing 4a more effectively and improves the lubrication life of the bearing 4a more effectively.

As described above, according to the present embodiment, heat transfer from internal air to the bearing 4a and heat conduction from the rotor core 7 are reduced to make it possible to suppress a temperature rise of the bearing 4a and improve the lubrication life of the bearing 4a.

Embodiment 2

Figure 3:
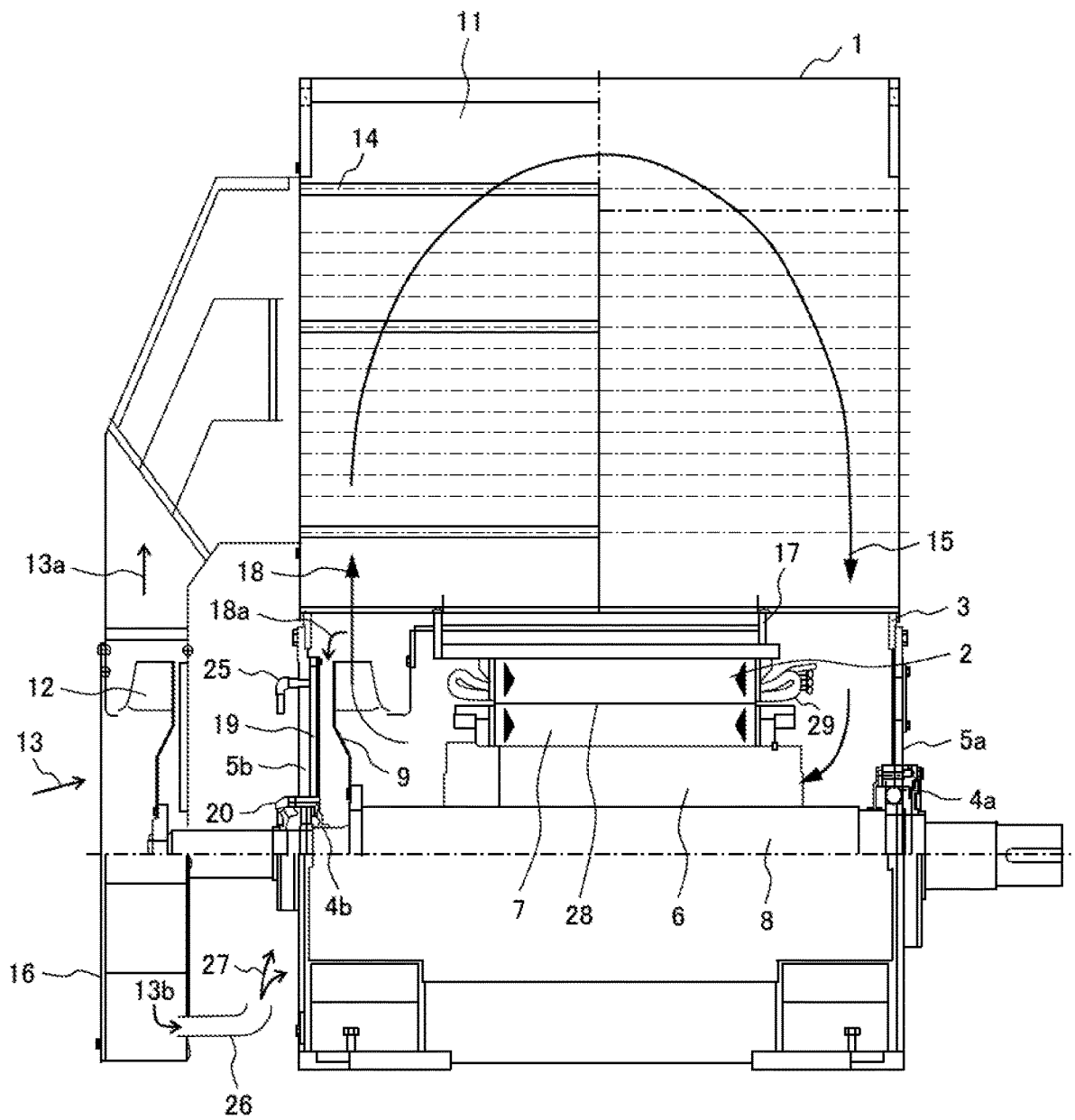
FIG. 3 is a longitudinal sectional diagram depicting a rotary electric machine according to Embodiment 2 of the present invention.

FIG. 3 depicts a rotary electric machine 1 according to Embodiment 2 of the present invention.

The rotary electric machine 1 of Embodiment 2 depicted in FIG. 3 has almost the same configuration as the rotary electric machine 1 of Embodiment 1 depicted in FIG. 1, but has a difference that the inner fan 9 is installed on the side where the outer fan 12 is installed. Namely, the inner fan 9 is installed on the side where the outer fan 12 is installed and, moreover, the heat insulating layer 19 is placed in the end bracket 5b on the side where the inner fan 9 is installed.

In the rotary electric machine 1 of the present embodiment, the bearing 4b placed on the exhaust side of the inner fan 9 may be overheated by the divergent internal-air 18a with increased temperature after cooling the rotor 6 and the stator 2, and the temperature of the bearing 4b may rise.

For this reason, in the rotary electric machine 1 of Embodiment 2, in order to prevent overheating of the bearing 4b placed on the exhaust side of the inner fan 9, the heat insulating layer 19 is provided in the end bracket 5b on the side where the inner fan 9 is installed, the end bracket 5b mounting the bearing 4b located on the downstream side of the cooling air flow. Other structures of the rotary electric machine 1 are the same as those of the rotary electric machine 1 of Embodiment 1.

In addition, as is the case for Embodiment 1, the external air communicating tube 25 or valve to make the heat insulating layer 19 communicate with external air may be provided to allow external cooling medium or cooling medium of the air cooler 11, such as air or water, to pass through the tube 25 or valve for cooling. This configuration also makes it possible to reduce a temperature rise of the bearing 4b.

Cooling the end bracket 5b may be performed in a simplest manner as below. The cooling air 13b taken in by the outer fan 12 is introduced through an outer fan duct 16 into the pipe 26 and the cooling air 27 is allowed to pass through the external air communicating tube 25 that makes the heat insulating layer 19 communicate with external air. This configuration reduces a temperature rise of the bearing 4a more effectively.

The present embodiment as described above, of course, has the same effect as in Embodiment 1 and also has such an effect that the pipe 26 can be shortened when the cooling air 13b taken in by the outer fan 12 is used for cooling because the bearing 4b placed on the exhaust side of internal air is near to the outer fan duct 16.

Embodiment 3

Figure 4:
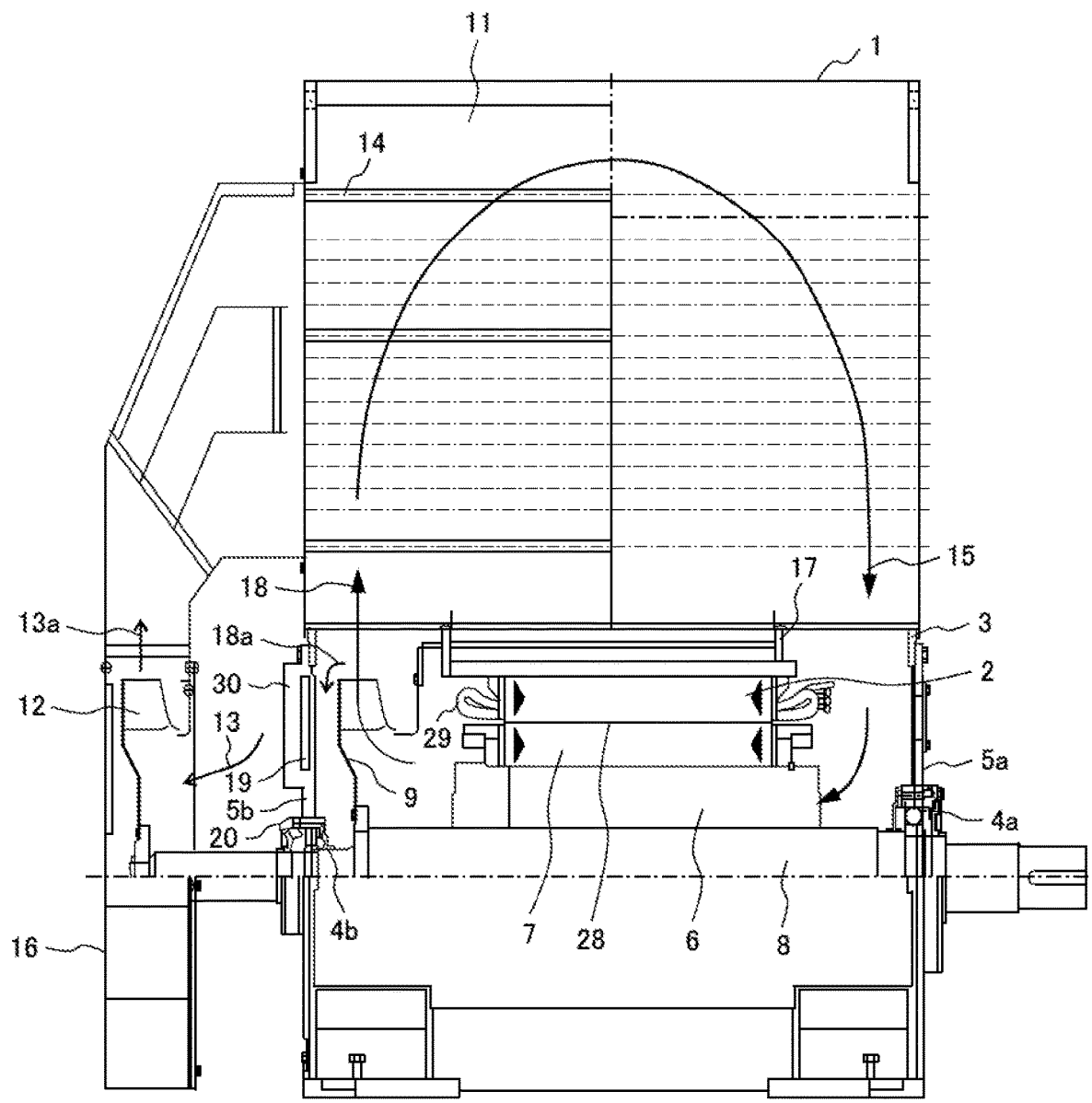
FIG. 4 is a longitudinal sectional diagram depicting a rotary electric machine according to Embodiment 3 of the present invention.

FIG. 4 depicts a rotary electric machine according to Embodiment 3 of the present invention.

In the rotary electric machine 1 of Embodiment 3 depicted in FIG. 4, which has almost the same configuration as the rotary electric machine 1 of Embodiment 2 depicted in FIG. 3, the cooling air 13 taken in from the outer fan 12 which is an air intake fan for the cooler directly connected to the rotor 6 is brought into a space around the bearing 4b, the bearing box 20, the end bracket 5b, and the cooling fin 30 to draw heat from the bearing 4a, and reduce the temperature of the bearing 4a. Other structures are the same as those of the rotary electric machine 1 of Embodiment 2.

The present embodiment as described above, of course, has the same effect as in Embodiment 2. Moreover, the present embodiment can enhance cooling of the bearing 4b.

Note that the foregoing embodiments are those described in detail to explain the present invention to make it easy to understand and the invention is not necessarily limited to those including all components described. In addition, a subset of the components of an embodiment may be replaced by components of another embodiment and components of another embodiment may be added to the components of an embodiment. In addition, for a subset of the components of each embodiment, other components may be added to the subset or the subset may be removed or replaced by other components.

LIST OF REFERENCE CHARACTERS

1 . . . rotary electric machine, 2 . . . stator, 3 . . . stator frame, 4a, 4b . . . bearing, 4c . . . outer ring, 4d . . . ball, 4g . . . grease, 4f . . . inner ring, 5a, 5b . . . end bracket, 6 . . . rotor, 7 . . . rotor core, 8 . . . shaft, 9 . . . inner fan, 11 . . . air cooler, 12 . . . outer fan, 13 . . . external air, 13a . . . first external air, 13b . . . cooling air, 14 . . . tube group, 15 . . . internal air, 15a . . . first internal air, 15b . . . second internal air, 15c . . . third internal air, 16 . . . outer fan duct, 17 . . . stator frame, 18 . . . arrow indicting the flow of internal air, 18a . . . divergent internal-air, 19 . . . heat insulating layer, 20 . . . bearing box, 21 . . . recess, 23 . . . cover, 23 . . . bolt, 24 . . . heat insulating material, 25 . . . external air communicating tube, 26 . . . pipe, 27 . . . cooling air, 28 . . . air gap, 29 . . . stator coil end, 30 . . . cooling fin.

What is claimed is:

1. A rotary electric machine comprising:
   a rotor including a shaft;
   a stator placed facing the rotor with an air gap therebetween and supported by a stator frame;
   bearings which rotatably support the shaft; and
   end brackets which hold the bearings,
   wherein one of the end brackets includes a heat insulating layer on an inner side or an outer side of the rotary electric machine to prevent heat from flowing into the bearings,
   wherein the heat insulating layer includes:
   a recess in one of the end brackets where an internal air or an external air flows;
   a heat insulating material placed in the recess; and
   a cover bolted to the end brackets to seal the heat insulating material, wherein the heat insulating layer is located, in order to insulate heat that enters one of the end brackets from a divergent internal-air diverged from internal air, on an internal-air side portion of one of the end brackets and in a place where one of the end brackets is exposed to the divergent internal-air from an inner fan, and wherein the heat insulating layer acts as thermal resistance against heat conducted through the stator frame from the stator.

2. The rotary electric machine according to claim 1, comprising:

the inner fan which is attached to the shaft and circulates air inside the rotary electric machine, wherein the heat insulating layer is placed in one of the end brackets located on a side where the inner fan is placed.

3. The rotary electric machine according to claim 2, wherein the heat insulating layer is placed in one of the end brackets located on a side where internal air is exhausted.

4. The rotary electric machine according to claim 1, wherein the bearings rotatably support the shaft at two positions in an axial direction, the stator and the rotor being between the two positions;

wherein the rotary electric machine further comprises:

an air cooler provided above the stator frame;

an outer fan which is attached to the shaft on a side of one of the bearings and brings cooling air into the air cooler; and the inner fan which is attached to the shaft on a side of another one of the bearings and circulates air inside the rotary electric machine, and wherein the heat insulating layer is placed in one of the end brackets located on a side where the inner fan is placed.

5. The rotary electric machine according to claim 4, further comprising:

an external air communicating tube and/or valve which makes the heat insulating layer communicate with external air, wherein the external air is brought into the heat insulating layer through the external air communicating tube and/or valve.

6. The rotary electric machine according to claim 5, wherein one of the end brackets is cooled by introducing cooling air through an outer fan duct of the outer fan into a pipe and allowing the cooling air introduced through the pipe to pass through the external air communicating tube which makes the heat insulating layer communicate with the external air.

7. The rotary electric machine according to claim 1, further comprising:

a fin placed on an outside surface of one of the end brackets.

8. The rotary electric machine according to claim 1, wherein the bearings rotatably support the shaft at two positions in an axial direction, the stator and the rotor being between the two positions;

wherein the rotary electric machine further comprises:

an air cooler provided above the stator frame;

an outer fan which is attached to the shaft on a side of one of the bearings and brings cooling air into the air cooler; and the inner fan which is attached to the shaft and circulates air inside the rotary electric machine, wherein the inner fan is placed on a side where the outer fan is placed, and wherein the heat insulating layer is placed in one of the end brackets located on a side where the inner fan is placed.

9. The rotary electric machine according to claim 8, wherein air from the outer fan is brought into a space around at least one of the bearings and one of the end brackets placed on a side where the outer fan is placed.

10. The rotary electric machine according to claim 1, wherein the heat insulating material is any one of an air layer, glass wool, rock wool, and a vacuum insulation material.

* * * * *